United States Patent [19]

Suckling

[11] 4,207,645
[45] Jun. 17, 1980

[54] ENGINE ACCESSORY

[76] Inventor: Douglas A. Suckling, 12 Snowdon Rd., Christchurch, New Zealand, 5

[21] Appl. No.: 961,058

[22] Filed: Nov. 16, 1978

[30] Foreign Application Priority Data

Aug. 1, 1978 [NZ] New Zealand .................. 188022

[51] Int. Cl.² ........................................... F01M 11/12
[52] U.S. Cl. ................................................. 15/210 B
[58] Field of Search ........................... 15/210 B, 218.1

[56] References Cited

U.S. PATENT DOCUMENTS

| 1,747,100 | 2/1930 | Ashworth | 15/210 B |
|---|---|---|---|
| 2,422,512 | 6/1947 | Wright | 15/210 B |
| 2,810,923 | 10/1957 | Desso | 15/210 B |
| 3,662,862 | 5/1972 | Poller | 15/210 B |
| 4,023,231 | 5/1977 | Haber | 15/210 B |

FOREIGN PATENT DOCUMENTS

| 654330 | 2/1965 | Belgium | 15/210 B |
|---|---|---|---|
| 69805 Ad.26588 | 9/1958 | France | 15/210 B |
| 338327 | 6/1959 | Switzerland | 15/210 B |
| 427417 | 4/1935 | United Kingdom | 15/210 B |
| 689384 | 3/1953 | United Kingdom | 15/210 B |
| 756704 | 9/1956 | United Kingdom | 15/210 B |

Primary Examiner—Edward J. McCarthy
Attorney, Agent, or Firm—Holman & Stern

[57] ABSTRACT

A device on or in which a dipstick of an engine can be cleaned, the device comprising a housing in which opposed cleaning faces are mounted, the housing having a U or V-shaped recess therein between which the opposed cleaning faces project, the housing being mounted by suitable means in association with a vehicle engine so that a dipstick thereof can be removed from the engine and readily drawn between the opposed cleaning faces to be cleaned thereby. The device can be used in association with a vehicle engine and be mounted under the bonnet of the vehicle near to the engine.

2 Claims, 2 Drawing Figures

ENGINE ACCESSORY

FIELD OF THE INVENTION

This invention relates to an engine accessory and more particularly relates to a cleaning device on which or through which a dipstick of an engine can be passed for cleaning.

DESCRIPTION OF THE PRIOR ART

In the past when it has been desired to clean a dipstick of an engine by removing oil or dirt therefrom a cleaning rag has been used. Frequently a cleaning rag is not to hand and time is wasted while a cloth or other suitable article is found on which the dipstick can be cleaned.

An object of the present invention is to provide a device on which or through which a dipstick can be passed for cleaning, which device is economic to manufacture and simple to install in a situation generally substantially adjacent an engine.

Further objects and advantages of the present invention will become apparent from the following description which is given by way of example only.

SUMMARY OF THE INVENTION

According to a broadest aspect of the present invention there is provided a device on or in which a dipstick of an engine can be cleaned, the device comprising substantially adjacent but opposed cleaning faces mounted in or by a frame, the frame being attachable to or fixed in a position substantially adjacent an engine, the arrangement being such that the dipstick of the engine can be cleaned for reuse.

According to a second aspect of the present invention there is provided a device on or in which a dipstick of a vehicle engine can be cleaned, the device comprising a housing in which opposed cleaning faces are mounted, the housing having a U or V-shaped recess therein between which the opposed cleaning faces project, the housing being mounted by suitable means in association with a vehicle engine so that a dipstick thereof can be removed from the engine and readily drawn between the opposed cleaning faces to be cleaned thereby.

The housing can be constructed from a plastics or metal material which is shaped to support the opposed cleaning faces which can be constructed from a foamed plastics material.

Other aspects of the present invention which should be considered in all its novel aspects will become apparent from the following description which is given by way of example only of an embodiment of the present invention.

BRIEF DESCRIPTION OF THE DRAWING

The embodiment of the present invention will now be described with reference to the accompanying drawing in which.

DESCRIPTION OF THE PREFERRED EMBODIMENT

Figure 1:
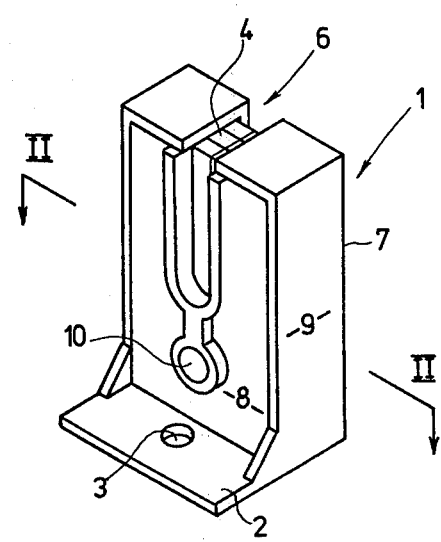
FIG. 1 is a perspective view from above of a device according to the present invention.
Figure 2:
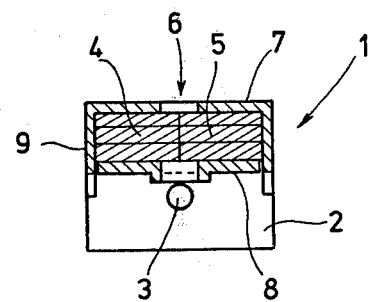
FIG. 2 is a cross section through the device shown in FIG. 1 viewed in the direction of the lines II—II.

The device according to the present invention, an example of which is shown in the accompanying drawing, can be fixed by any suitable means in a position substantially adjacent an engine. For example, the device can be screwed, clipped, bolted, welded or glued in a position close to the engine. For example, the device can be positioned on a fire wall or a mounting substantially adjacent an engine of a vehicle or the engine of a compressor or other apparatus. The device being positioned so that access can be readily gained thereto.

The embodiment of device shown in the drawing has a housing generally indicated by arrow 1 having a mounting part 2 thereof with an aperture or hole 3 therein through which a fixing means, for example a self-tapping screw or bolt, can be passed in order to fix the device 1 in position close to an engine.

The device 1 has opposed cleaning members 4 and 5 which can be constructed from a foamed plastics material, cloth or other absorbant material and defining cleaning faces therebetween. The opposed members 4 and 5 can have therebetween a small gap (not shown) if desired.

In the embodiment shown the opposing members 4 and 5 are constructed from separate layers of foamed plastics material. The layers of material are flexible so as to allow a dipstick to be drawn therebetween.

The opposed members 4 and 5 are mounted as shown so that the cleaning faces thereof extend into a recess 6 formed in an upstanding position 7 of the device 1. The recess 6 is slightly larger than the diameter of most engine dipsticks so that a variety of different types of dipstick can be readily drawn therethrough to remove therefrom any oil or dirt which is wiped off onto the opposed cleaning faces of members 4 and 5.

In the construction shown in the drawing the housing 1 is constructed in two parts 8 and 9. A first part being a male member 8 and the second part being a female member 9 which are joined together with a space therebetween in which space the cleaning material is sited. The parts 8 and 9 can be joined together by any suitable fixing means, for example, glue or as shown a rivet 10. It will be seen that the female part 8 has a rear wall 7, peripheral walls and an open front. The mounting part 2 extends from the lower peripheral wall and there is an opening across the upper peripheral wall which extends part-way down the rear wall and which with a complimentary opening in the male part 8 defines the recess 6.

In use the device 1 according to the present invention is situated in a position substantially adjacent an engine so as to be handy thereto. When a dipstick is removed from the engine it can be readily drawn between the opposed faces 4 and 5 to remove oil and water etc. therefrom.

Preferably the device 1 is fitted to the fire wall or under the bonnet of a vehicle close to an engine thereof so that at any time the user of the vehicle can clean the dipstick of the vehicle's engine without having to search unnecessarily for a cleaning rag or cloth.

It is to be appreciated that it may be necessary to occasionally remove the device 1 from its normal position so that it can be cleaned by rinsing it in a cleaning fluid to clean the cleaning faces.

Thus according to the present invention there is provided a device in or on which the dipstick of an engine can be cleaned, which cleaning device is economic to manufacture and simple to install so as to be readily available for use.

A particular embodiment of the invention has been described by way of example only and it is envisaged that modifications to and variations of the invention can take place without departing from the scope of the appended claims.

What I do claim and desire to obtain by Letters Patent of the United States of America is:

1. A device for cleaning a dipstick comprising a two-part housing including a female part and a male part, said female part having a rear wall means, peripheral wall means, an open front and a mounting part extending from a first portion of said peripheral wall means for attaching the housing to an object, means defining a elongated opening in said female part extending across a second portion of said peripheral wall means and along a portion of said rear wall means, said male part fitting in said open front of said female part and including an elongated opening aligning with said elongated opening in said female part to define therewith a recess for receiving a dipstick to be cleaned, means for fixing said male part to said female part in said open front of said female part to define a receptacle for a cleaning means, said receptacle being bounded by said rear wall means and peripheral wall means of said female part and by said male part, cleaning means recieved within said receptacle and being supported by said rear wall means said peripheral wall means and said male part, said cleaning means comprising a plurality of layers of flexible cleaning material, the individual layers extending in planes substantially parallel to said rear wall means and said male part and means defining opposed cleaning faces in each of said layers, said faces being mutually aligned and being accomodated in said recess to allow a dipstick to be drawn through the layers for cleaning.

2. The device of claim 1 wherein said male and female parts of said housing are of complimentary rectangular shape, said mounting part of said female part extending from one peripheral end wall thereof and said opening being formed in the opposite peripheral end wall thereof.

* * * * *